J. G. A. KITCHEN & I. H. STOREY.
PNEUMATIC TIRE.
APPLICATION FILED OCT. 21, 1907.

948,701.

Patented Feb. 8, 1910.

Witnesses

Inventors
John G. A. Kitchen
Isaac H. Storey
by J. Singer
Att'y

UNITED STATES PATENT OFFICE.

JOHN GEORGE AULSEBROOK KITCHEN, OF LANCASTER, AND ISAAC H. STOREY, OF AMBLESIDE, ENGLAND.

PNEUMATIC TIRE.

948,701.  Specification of Letters Patent.  Patented Feb. 8, 1910.

Application filed October 21, 1907. Serial No. 398,491.

*To all whom it may concern:*

Be it known that we, JOHN GEORGE AULSEBROOK KITCHEN and ISAAC HENRY STOREY, subjects of the King of Great Britain and Ireland, and residents, respectively, of Lancaster, in the county of Lancaster, and of Ambleside, in the county of Westmoreland, England, in the Kingdom of Great Britain, have invented certain new and useful Improvements in Pneumatic Tires, of which the following is a specification.

This invention relates to improvements in the construction or arrangement of the cover or jacket parts of pneumatic tires composed of segments having interfitting ends and the invention has for its objects to enable the tire to be quickly put together and repaired when damaged, and to obtain a tight joint at the seams of the cover.

The improvement consists of making the tire cover of segments open at their base portions and their ends, each alternate segment having two wedge like ends or projections fitting into the overlapping ends of the two adjacent segments, and a ridge of soft rubber projecting from the periphery of said alternate segments and extending between and engaging the ends of the adjacent segments.

Figure 1:
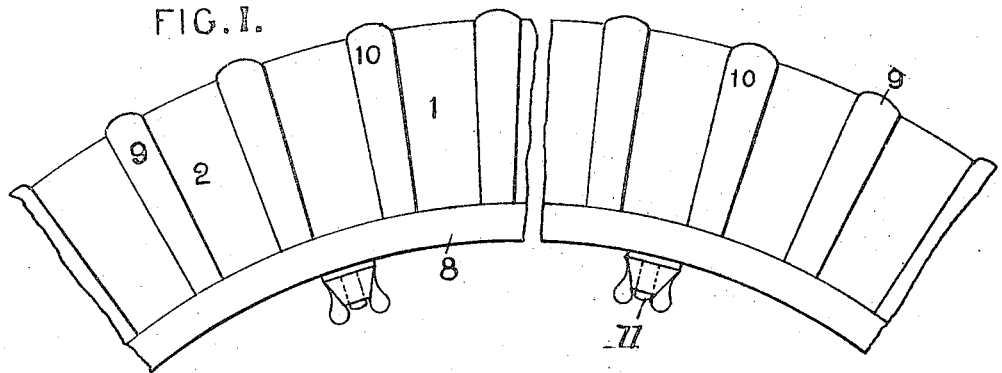
Figure 2:
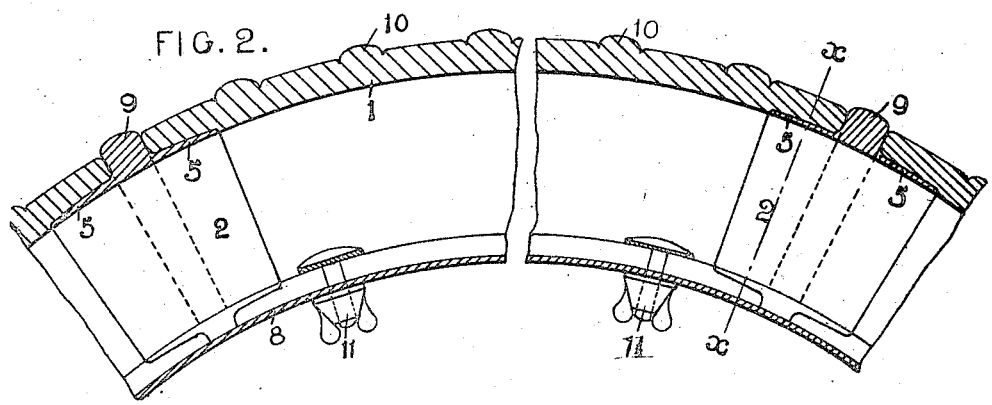
Figure 3:
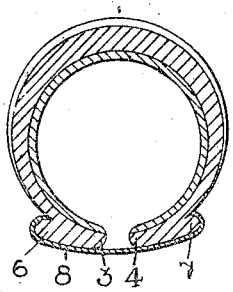

On the drawings attached hereto Figure 1 shows an elevation of a portion of a tire made in accordance with this invention and fitted to a rim of the well known clencher tire; Fig. 2 shows a longitudinal section of the same and Fig. 3 a cross section on line *x—x* Fig. 2.

The cover consists of a number of alternate segments 1 and 2 preferably 4 or 6 of each. The segments 1 are built up as usual of india rubber and canvas, the canvas not being indicated separately on the drawing, and have the usual configuration of a tire in section, being split with the opposite edges 3 and 4 provided with beading 6 and 7 to enter the lateral recesses of the rim 8. They are open at both ends and may be conical at the ends as shown. The alternate segments 2 have wedge shaped ends 5 fitting within the ends of segments 1 and extending throughout the internal transverse length of the same. They are preferably made thin, so that they can be easily folded around the continuous air tube (not shown) to a smaller diameter than the segments 1 to facilitate their being pushed into the ends of the segments 1. The segments 2 are each formed with a ridge 9 of soft india rubber, which may project above the adjacent segments shown and be of any width, which ridge comes on the ground in driving, becomes flattened and thereby pressed against the edges of the two adjacent segments 1 and makes a water and dirt tight joint against them. When the ridges project as shown, the segments 1 are preferably formed with corresponding ridges 10 which prevent slipping.

The segments 1 are clamped to the rim in the usual way by bolts 11 disposed near to their ends. One of these segments is first fixed on, then a segment 2 pushed into it and the next segment 1 is placed over its projecting end and so on. Each of the segments 1 can readily be taken off, repaired and replaced without disturbing the others.

The air tube is not shown in the drawings, but is in all cases a continuous tube.

We claim:—

1. A pneumatic tire comprising a plurality of segments open at their ends and at their base portions, said segments having wedge-like parts interfitting in overlapping relation to form a continuously closed cover, and a transversely disposed ridge of soft rubber extending between and engaging the ends of adjacent segments and serving upon the imposition of pressure to spread or flatten against said segments.

2. In combination, a wheel rim, a plurality of segments open at their ends and at their base portions adjacent said rim, the open ends of said segments having interfitting overlapping parts extending throughout the length of said segments, the parts of one segment being adapted to fit internally and the parts of the segment adjacent thereto being adapted to fit externally upon said first mentioned segment, said segments having said internal parts provided with a peripherally disposed ridge of soft rubber adapted to flatten against the exterior overlapping parts of the adjacent section and upon the imposition of pressure, and means for securing said segments to said rim.

In testimony whereof we have hereunto affixed our signatures in the presence of two witnesses.

JOHN GEORGE AULSEBROOK KITCHEN.
ISAAC H. STOREY.

Witnesses:
 WM. JONES,
 CARL BOLLÉ.